US008715819B2

(12) United States Patent
Gencer et al.

(10) Patent No.: US 8,715,819 B2
(45) Date of Patent: May 6, 2014

(54) WATERPROOF, THERMAL INSULATING RADIANT REFLECTIVE ROOFING LAMINATE

(75) Inventors: Mehmet A. Gencer, Brecksville, OH (US); Paul M. Zakriski, Broadview Heights, OH (US); Clark B. Langmack, Gates Mills, OH (US)

(73) Assignee: Imet Corporation, Cleveland, OH (US)

( * ) Notice: Subject to any disclaimer, the term of this patent is extended or adjusted under 35 U.S.C. 154(b) by 202 days.

(21) Appl. No.: 12/932,960

(22) Filed: Mar. 10, 2011

(65) Prior Publication Data

US 2011/0223410 A1    Sep. 15, 2011

Related U.S. Application Data

(60) Provisional application No. 61/340,043, filed on Mar. 12, 2010, provisional application No. 61/341,068, filed on Mar. 26, 2010.

(51) Int. Cl.
*B32B 5/32* (2006.01)
*B32B 37/24* (2006.01)

(52) U.S. Cl.
USPC ..... 428/316.6; 428/116; 428/118; 428/319.1; 428/319.3; 428/319.7; 156/292

(58) Field of Classification Search
USPC ............ 428/116, 118, 316.6, 319.1, 319.3, 428/319.7; 156/292
See application file for complete search history.

(56) References Cited

U.S. PATENT DOCUMENTS

| 3,795,180 | A | | 3/1974 | Larsen | |
| 3,930,085 | A | * | 12/1975 | Pasiuk | 428/116 |
| 4,189,886 | A | | 2/1980 | Frohlich et al. | |
| 4,601,150 | A | | 7/1986 | Dougherty | |
| 4,674,249 | A | | 6/1987 | Bennett, Jr. | |
| 4,860,510 | A | | 8/1989 | Kotler | |
| 5,879,780 | A | * | 3/1999 | Kindinger et al. | 428/116 |
| 6,673,415 | B1 | * | 1/2004 | Yamazaki et al. | 428/117 |
| 6,855,393 | B1 | * | 2/2005 | Ayres | 428/116 |
| 7,157,112 | B2 | | 1/2007 | Haines | |
| 7,345,616 | B2 | * | 3/2008 | Williams | 342/4 |
| 2003/0207075 | A1 | * | 11/2003 | Maignan et al. | 428/116 |

(Continued)

FOREIGN PATENT DOCUMENTS

JP    2000-192616    7/2000

OTHER PUBLICATIONS

Translation of JP 09-228507, Sugaya et al., "Composite Heat Insulative Panel", Sep. 2, 1997.*

*Primary Examiner* — Hai Vo

(74) *Attorney, Agent, or Firm* — Hudak, Shunk & Farine Co. LPA

(57) ABSTRACT

A waterproof roofing laminate comprises a cellular plastic support layer, an insulation layer located thereon, and a cover layer that reflects radiant energy such as infrared light, visible sunlight, and ultraviolet light. The cellular support layer contains a plurality of cavities therein that can be open or closed cell. The support layer can also have a solid continuous top and/or bottom surface layer. The insulation layer is located on the support layer and can be formed of numerous materials including natural or synthetic fibers, organic or inorganic material, and is free of cement and styrofoam. The waterproof cover layer is located on the insulation layer and is capable of reflecting radiant energy by being of a light color and/or containing radiant reflective materials therein.

12 Claims, 2 Drawing Sheets

(56) References Cited

U.S. PATENT DOCUMENTS

| | | | |
|---|---|---|---|
| 2006/0234010 A1* | 10/2006 | Wirrick et al. | 428/174 |
| 2008/0083184 A1 | 4/2008 | Smith | |
| 2008/0086982 A1* | 4/2008 | Parenteau et al. | 52/794.1 |
| 2008/0268225 A1* | 10/2008 | Dehennau et al. | 428/306.6 |
| 2009/0124719 A1* | 5/2009 | Creazzo et al. | 521/137 |
| 2009/0249709 A1 | 10/2009 | Hofmeister | |
| 2010/0047620 A1* | 2/2010 | Decker et al. | 428/688 |
| 2010/0095618 A1* | 4/2010 | Edison et al. | 52/309.1 |

\* cited by examiner

WATERPROOF, THERMAL INSULATING RADIANT REFLECTIVE ROOFING LAMINATE

CROSS-REFERENCE

This application claims the priority filing dates of U.S. Provisional Application Ser. No. 61/340,043 filed Mar. 12, 2010 and U.S. Provisional Application Ser. No. 61/341,068, filed Mar. 26, 2010, both herein fully incorporated by reference.

FIELD OF THE INVENTION

The present invention relates to a roofing laminate that is waterproof, reflects radiant energy and has at least one impervious cellular plastic support layer that contains open and/or closed cells, an insulation layer that is secured to the support layer, and a cover layer is generally self-adhering to said insulation layer and is capable of reflecting infrared light, visible light, and ultraviolet light. In another aspect the invention qualifies as a "green roofing system".

BACKGROUND OF THE INVENTION

Heretofore, roofing systems as for buildings, especially flat roof buildings, merely related to some sort of felt paper having an asphalt or rubber layer thereon. Such systems generally cracked with time, do not provide broad spectrum reflectivity, exhibit poor thermal insulation characteristics, generally are hydroscopic causing premature failures, often contain noxious and/or hazardous chemicals requiring special handling during installation and special provisions during disposal with no "sustainable end-of-life" solution. Another common type of roofing system utilized styrofoam as insulation and generally contained an asphalt or rubber layer thereon. This type of roofing structure also had the drawbacks of the above-noted system and furthermore was prone to leaks since a person walking on the roof tended to crush the styrofoam insulation causing the asphalt or rubber coating to crack and lead to leakage problems.

U.S. Pat. No. 3,795,180 relates to a net, preferably an extruded plastic net, to provide a raised surface and a drainage means for a sloped deck.

U.S. Pat. No. 4,189,886 relates to a roofing system wherein moisture entrapped within roofing systems of the type wherein a layer of normally low-permeance, cellular plastic insulation board (e.g. foamed polystyrene) is employed in conjunction with at least one layer of moisture-bearing construction material (e.g. lightweight insulating vermiculite concrete) is able to be vented from within the system by providing the board with a plurality of openings therethrough and further preventing the fluid construction material when placed upon the board from entering and filling the openings.

U.S. Pat. No. 4,601,150 relates to providing a roofing panel comprising a layer of closed cell plastic foam and a layer of mortar. A reinforcing grid is disposed within the mortar layer.

U.S. Pat. No. 4,674,249 relates to ventilated roof construction for flat roof installations, that substantially decreases damage caused by roof leaks, that allow water to settle into the roofing substratum and insulation. A grid or perforated plate is supported in spaced arrangement above the underlying roofing support deck and immediately beneath the exterior roofing surface to define an air passageway or air duct therein. The grid allows evaporation of moisture from the insulation layer therethrough as air circulates thereunder. A plurality of conduits leading from the grid to the exterior roofing surface provide means for vacuuming accumulated water from the interior roofing structure to avoid damage thereto, or to pump water into the interior roofing structure to extinguish fires.

U.S. Pat. No. 4,860,510 relates to a modular tile for interlocking with other similar tiles to form a surface covering which provides a cushioned surface suitable for use in an outdoor playground environment which allows water to substantially flow thereunder for purposes of draining free from the tile. The tile includes a flat support grid having a top and bottom surface and including a repeating pattern of intersecting cross members which are integrally formed with interstitial openings therebetween. A plurality of support legs are attached at the bottom surface of the support gird to raise the grid above the supporting surface of concrete or other material. Means are provided around the perimeter of the support grid to allow attachment of additional grids in an interlocking manner. A cushion plate having top and bottom surfaces is adhered to the top of the support grid to form an integral tile which cooperatively provides impact protection for playing children, as well as increased comfort, yet which enables flow of water and protection of tile structure against mildew and other water damage.

U.S. Publication 2008/0083184 relates to a Styro Roofing System that is an all-in-one roofing and partitioning system that eliminates the use of plywood sheeting, insulation, tarpaper, flashing, shingles, guttering and partitioning like sheet rock. Styro Roofing System is prepared using plastic and foam. There is a grid and rigid plastic sheeting which is one mold, foam, mesh and a clay base cement finish. There are three types of panels, the gutter panel, the sheeting panel and the partition panel. The grid acts as conventional plywood sheeting and is drilled directly to the roof rafters.

U.S. Publication 2009/0249709 relates to a roof construction having a roof skin mounted on a base construction and including a bottom skin and a top skin mounted above and spaced apart from the bottom skin, the roof skin having a two-dimensionally curved surface, the bottom skin being supported on the base construction via a grid that is formed by plane plates oriented normal to the plane of the grid and crossing one another, top edges of the plates being curved to define the curvature of the roof skin, the surface of the roof skin being divided into segments at least some of which are spanned by an associated set of straight lines and the top skin is held at a constant spacing from the bottom skin by spacer profiles extending along the straight lines.

Japanese Publication 2000-192616 relates to flat roof structure containing a net laid over the upper surface of a waterproof layer on a flat roof, and a walking floor member laid over the upper surface of the net. The net is constituted of a positive grid or a diagonal grid consisting of a number of longitudinal wires and lateral wires formed of a synthetic resin or a metal, which net is directly laid over the waterproof layer.

SUMMARY OF THE INVENTION

The present invention includes various roofing laminate systems that generally contain two to three components, for example, a plastic support layer and an impervious cover layer, or a support layer and an insulating layer, or a plastic support layer, an insulating layer, and an impervious cover layer. The laminate can withstand heavy loads without crushing, is quick and easy to install, is economical, meets environmental green standards, and is capable of reflecting radiant lights such as visible light, infrared light, as well as UV light. The plastic support layer has a plurality of cells that optionally can contain insulation, and can be of any size, shape, and the like and is impervious to gases such as air and liquids such as water.

A roofing laminate, comprising: one or more non-foam, cellular, plastic support layers having a plurality of cells therein, said support layer optionally having a top surface layer and optionally a bottom surface layer; and one or more non-cementatious, insulation layers located on said support layer, and optionally one or more cover layers.

A roofing laminate comprising one or more non-foam, cellular, plastic support layers having a plurality of cells therein, said support layer optionally having a top surface layer and optionally a bottom surface layer; and one or more radiant energy reflective, waterproof impervious top cover layers located on said insulation layer.

A process for forming a roofing laminate, comprising the steps of forming one or more non-foam, cellular, plastic support layers having a plurality of cells therein, said support layer optionally have a top surface layer and optionally a bottom surface layer; and applying one or more non-cementatious, non-styrofoam insulation layers to said plastic support layer and forming a support layer-insulation layer laminate, and optionally applying one or more cover layers.

A process for forming a roofing laminate, comprising the steps of forming one or more non-foam, cellular, plastic support layers having a plurality of cells therein, said support layer optionally have a top surface layer and optionally a bottom surface, layer; and applying one or more radiant-energy reflective, water-proof, impervious top cover layers to said support layer.

DETAILED DESCRIPTION OF THE INVENTION

Figure 1:
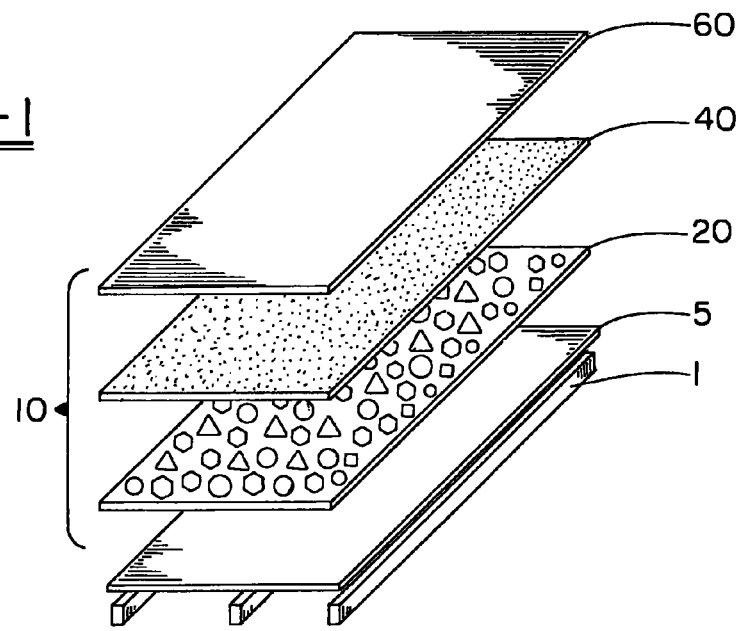
FIG. 1 relates to an expanded perspective view of a roofing laminate of the present invention residing on a roof.

FIG. 1 is an example of a waterproof, thermal guard roofing system of the present invention wherein roof rafters 1 generally support roof member 5 such as plywood, particle board, corrugated steel, or other support members known to the art and to the literature. Roofing laminate 10 of the present invention generally comprises one or more cellular plastic support layers 20, one or more insulation or batting layers 40, and one or more top cover layers 60. The roofing laminate of the present invention has advantages such as strength and ease of insulation thus resulting in reduced labor costs, provides significant energy savings, contains a seamless exterior laminate surface, can be environmentally green, and significantly increases the lifetime of the roof.

Figure 3:
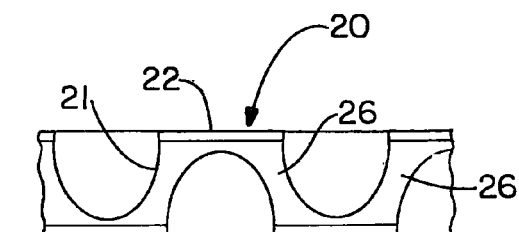
FIG. 3 is a cross-sectional view of the plastic support layer of the present invention having a top surface layer, a bottom surface layer, and a central core.

The cellular plastic support layer of the present invention is rigid, strong, light weight, has insulating qualities, optionally is impervious such as to water and air and is not a foam plastic. It is capable of withstanding heavy loads such as a person walking thereon and thus has a crush-resistance of at least about 25 or at least about 50 psi, or 1.75 or or 3.5 kg/cm$^2$, and desirably at least about 70,000 kilograms (kg) per square meter. By light weight it is meant that the square meter of the support layer generally weighs from about 0.5 kg or about 1 kg to about 4 kg and often is less than 2 kg per square meter. This support layer can be made out of numerous different types of rigid plastics and have numerous different types or shapes of cells or cavities therein. Included within the definition of a rigid plastic are various fiberglass compounds that are solid, i.e. non-foam. The plastic-fiberglass can thus serve as support layer 20 having a core 26 and optionally as either top surface layer 22 or bottom surface layer 24. Suitable polymers include various olefins such as polyethylene and polypropylene, various polyamides or nylons, various polycarbonates, various polyesters, various biodegradable polymers made from lactic acid and other biodegradable polyesters, various polyacrylates and polymethacrylates, various polyvinyl chlorides, various non-foamed polystyrenes, various polyimides, various polyurethanes, various EPDM, various ABS, or copolymers of the foregoing, or various recycled thermoplastics, and any combination thereof. The plastic supports have various vertical thicknesses depending upon the end use such as from about 0.5 cm to about 10 cm and desirably from about 1 cm to about 4 cm. The plastic support layer has numerous cells 21 therein that can be open or closed. When closed, it can exist totally within the support layer. Desirably, the cells whether open or closed and generally either extend to near the top surface or the bottom surface of the support layer. Numerous types and sizes of the open and closed cells thus exist as for example a support layer having a discontinuous top surface layer 22 and a discontinuous bottom surface layer 24 wherein open cells extend to either to the top surface and/or the bottom surface and are open to the atmosphere through said discontinuous portions of the top and/or bottom surface layer as shown in FIG. 3. That is, support layer 20 has a central core 26 with a discontinuous top layer 22 and a discontinuous bottom layer 24 and thus has open cells 21 that extend upwardly through the support layer as well as open cells that extend through the bottom of the support layer. Of course, if at least one of the top surface layer 22 or the bottom surface layer 24 is continuous, then closed cells can be formed within the support layer 20. The existence of a continuous surface layer be it either the top surface layer or the bottom surface layer or both, thus results in an impervious support layer 20 that is preferred in the present invention.

The shapes of cells or cavities 21 are numerous as for example spherical, polygonal, or honeycomb, and the like. Examples of specific shapes include those set forth in the top view portions of FIGS. 4A through 4M and thus can be hexagonal, offset, herringbone, brick, pyramid, diamond, rectangular, egg crate, honeycomb, and the like. The width of the cells can vary over a wide range. The plastic of top surface layer 22 can be the same as that of bottom surface layer 24 or they can be different and independently the materials of the top and bottom surface layer can be the same or different than the core layer. It should thus be apparent to one skilled in the art that numerous types of combinations, sizes, shapes, etc. of cellular plastic support layers of the present invention exist.

The cells of the support layer, when closed provide insulating air pockets, and when open can be empty, partially filled, or totally filled or embedded with small, micro, or nano-size particles, pellets, foam (open or closed cell), gels, or earthen products. One type of composition is the various plastics that can form the above-noted plastic support layer. The various particles, pellets, etc., are preferably of an insulating nature and include zeolites, pumice, talc, silicates, silica gels, aerogels, clay, sand, carbon, coal, wood, corn, wood shavings, plastic shavings, rice, rice hulls, down, glass, fleece, hemp, flax, alumina, celites, lime, various plastic fibers, various glass fibers, vermiculite, wool, cotton, jute, and the like as well as various insulating materials set forth hereinbelow with regard to insulation layer 40 that is hereby fully incorporated by reference.

Desirably the support layer is secured to the building roof through the use of any adhesive known to the art and to the literature. For example, adhesives include butyl adhesives, neoprene, thermoplastic compounds, industrial glue, wood glue, and other similar compounds. Building roofs are generally made out of plywood, particle board, or less desirably metal, and the adhesive binds the support layer thereto. Thus, the roofing laminates of the present invention preferably are free of nails, screws, staples, and the like that secure the laminate to the roof.

The plastic support layer, if desired, can contain various additives well known to the art and to the literature, such as flame retardants, stabilizers, fillers, walnut shell, silica sand and the like.

Support layer 10 is not made out of a plastic foam such as styrofoam inasmuch as noted above, the same is generally crushable when walked upon by a heavy person and can result in cracks, tears, punctures, holes, etc., in any asphalt or rubber layer located thereon. Support layer 10 is also generally not made of a metal inasmuch as the same is generally expensive, can corrode from moisture, etc., and has a large coefficient of expansion that can result in tearing of the cover layer thereon.

As seen in FIG. 1, the roofing laminate of the present invention comprises an insulation layer or batting 40 that is located over or resides upon plastic support layer 10 and desirably is secured thereto in any conventional manner and desirably through the use of an adhesive that can be the same as the adhesive, or a different adhesive, that adheres the support layer to the building roof. Insulation layer 40 serves to abate transfer of heat from out of a building in cold weather as in winter, and to prevent transfer of heat into a building from the Earth's atmosphere as in summer.

Numerous types of material can be utilized for insulation to yield a desired R value and the overall thickness of insulation layer 40 can vary widely depending upon the amount of heat or cool air retention desired. Thus, insulation layer 40 can vary as from about 0.25 cm to about 25 cm and often from about 0.5 cm to about 4 cm or 8 cm. The insulation material or batting can come in different forms such as fibers, particles, or pellets, foams, gels, earthen products and the like that are organic or inorganic, or any combination thereof.

The fibers can be natural, cellulosic, or synthetic. Natural fibers include those derived from animals such as alpaca, angora, camel, cashmere, catgut, chiengora, llama, mohair, pashmina, qiviut, rabbit, silk, sinew, spider silk, wool, vicuna, yak, and any combination thereof. Other fibers are derived from plants such as abaca, coir, cotton, flax, hemp, jute, kapok, kenaf, pina, raffia palm, ramie, sisal, wood, nettles, esparto, milkweed, papaya, umbrella plant, rice straw, wheatstraw, esparto grass, bagasse, and any combination thereof. Natural fibers can also be derived from various minerals such as asbestos, basalt, mineral wool, glass wool, and any combination thereof.

Cellulose fibers include acetate, art silk, bamboo, lyocell (Tencel), modal, rayon, and recycled papers desirably treated with a flame retardants, and any combinations thereof.

Examples of synthetic fibers include rayon; nylon; modacrylic fibers composed of less than 85% by weight of acrylonitrile; aramid such as Twaron®; Kevlar®; Technora®; and Nomex® made by DuPont; acrylic; olefin; polyester; carbon; Vinyon that is a long chain synthetic polymer composed of at least 85% by weight of vinyl chloride units; Saran® that is a polyvinylidene chloride made by Dow; Spandex that is a long-chain synthetic polymer comprised of at least 85% of a segmented polyurethane; dyneema/spectra; polybenzimidazole fiber; polypropylene; sulfar; lyocell; PLA; PBI; M-5 (PIPD fiber); Orlon® that is a copolymer containing at least 85% acrylonitrile made by DuPont; Spectra®; Zylon®; Vectran®; and Derclon®; and any combination thereof.

In lieu of or in combination with the above noted fibers, particles or pellets, can be utilized that are natural, cellulosic, or synthetic. Examples of such particles include the above noted fibers that have been cut, chopped, or otherwise reduced to small particles and the like and hence are hereby fully incorporated by reference rather than being repeated. Mineral particles or pellets additionally include zeolites, pumice, talc, silicates, clay, sand, carbon, coal, wood, corn, wood shavings, plastic shavings, rice, rice hulls, down, glass, fleece, hemp, flax, alumina, celites, lime, various plastic fibers, various glass fibers, vermiculite, wool, cotton, jute, mineral wood, glass wool, mullite, or celite, or any combination thereof. The size of the particle pellets can vary greatly and even be very small such as having an average diameter of microns or nanometers and can be open or closed cell.

The above-noted various fibers, pellets, particles, and the like can exist in various shapes or embodiments but generally are available as layers, batts, sheeting, or felt. Short fibers or pellets, particles, etc., can be adhered together or desirably are contained as packages, for example within plastic bags, or can exist as bundled, pressed, or non-woven sheeting, etc.

Insulation layer 40 can also be made of various strong foams, i.e. able to withstand crush strengths of at least 3 kg/cm$^2$ and desirably at least 60,000 kg per square meter as noted above, such as urethane foams, urea urethane foams, or other polymeric foams, and any combination thereof. While styrofoam can be utilized, it is generally avoided and hence not used. The various foams can be open or closed foam celled.

Insulating gels include silica gels as well as various aerogels such as those made by Aspen Inc. of Northborough, Mass. as under the trademark Spaceloft®.

Examples of earthen products include diatoms, diatomaceous earth, and the like.

However, not all types of materials are utilized as insulation materials. Naturally heat-conducting materials such as metals, brick, sandstone, cement and concrete are not utilized. Another type of material that is excluded from the present invention are various styrofoams, i.e. foams made out of polystyrene, and other foams that are crushable and can result in tears, cuts, cracks, punctures, and the like that can readily lead to leakage problems with regard to the roofing laminate. Materials such as various cements and concretes are also excluded from the insulation layer of the present invention are because they are too heavy, place undue weight upon the roofing substrate and can cause the same to collapse, and are also expensive.

The present invention can generally be referred to as a "green roofing system". That is, the roofing laminate can have an R value of from about 1 to about 40, desirably from about 2 to about 20, and preferably from about 3 to about 10, and is made from materials or compositions that have been recycled, or can be recycled, or are biodegradable.

The laminate of cellular plastic support layer and the insulation layer results in a strong and highly energy efficient (e.g. high R values) roofing laminate. Inasmuch as the support and insulation layer can come in panels, for example 4×10 foot, they are easily installed to a roof, and especially a flat roof, and can readily be adhered thereto as well as to one another by utilizing an adhesive. The adhering feature of this system provides a complete and uniform water-tight surface of high durability and strength which each roofing laminate being connected to each other such as being abutted thereto, overlapped therewith, etc., and is attached to a member of the roof. That is, as with ordinary asphalt house shingles, the laminates of the present invention can overlap one another either on a flat roof or preferably on a sloped roof. Thus, the roofing laminate comprising the plastic support layer and the insulation layer does not require time consuming installation aspects such as drilling holes for screws, utilizing nails or other time consuming installation aspects. The laminate of cellular plastic support layer and the insulation layer are hydrophobic and will not degrade in the presence of water. Unlike nearly all roofing systems, they do not contain noxious and/or hazardous chemicals requiring special handling during insulation. Further, this laminate of cellular plastic support layer and the insulation layer has a "sustainable end-of-life" solution without the need for special provisions during disposal.

Figure 2:
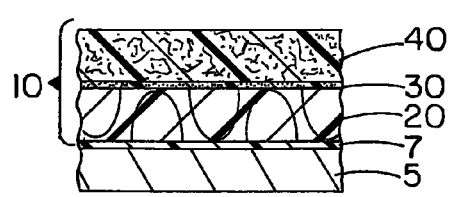
FIG. 2 is an elevational view of a roofing laminate of the present invention.

With respect to forming a laminate such as set forth in FIG. 2, one or more insulation layers 40, that are desirably waterproof and can be the same or different, are applied to one or more support layers 20, that can be the same or different, in any conventional manner and is secured or adhered thereto as by using an adhesive 30. FIG. 2 relates to an embodiment that contains only a support layer and an insulation layer that is thus waterproof. As with the application of the support layer to the roof surface, adhesives are generally preferred because they are effective, time-saving, and reduce labor costs as compared to the use of fasteners such as screws, nails, and the like. Desirably, insulation layer 40 is applied over the seam of two abutting support layers 20. The formed support layer-insulation layer laminate that can be made in a factory is then applied to roof 5 that, as noted above, can be made out of particle board, plywood, and the like. Adhesive 7 then secures the laminate to the roof. Adhesive 30 can be the same or different as adhesive layer 7 and are well known to the art and to the literature. Generally such adhesives include butyl adhesives, neoprene, thermoplastic adhesives, industrial adhesives, and generally any water-proof adhesive that is known to the art and to the literature.

An important aspect of the present invention is the utilization of a radiant energy reflective, water-proof, preferably impervious cover layer that preferably has most of the following properties. Cover layer 60 should be pliable, flexible, or resilient so it can tolerate expansion or contraction due to temperature change or pressure applied thereto as by a person's foot. The cover layer should be easily applied preferably in the form of a liquid that can be sprayed, brushed, rolled upon, etc., insulating layer 40. While not shown, an embodiment of the present invention relates to a laminate wherein a cover layer is located upon a support layer without any intervening insulating layer.

An essential aspect of the cover layer is that it reflects radiant energy, that is, infrared light, visible light, and ultraviolet light, i.e. radiation having a wavelength of from about $10^{-3}$ to about $10^{-8}$ meters. Cover layer 60 should also be weather resistant with regard to extreme temperatures such as from about −50° F. or about −30° F. to about 150° F. and even 200° F. A desired aspect of the cover layer is that it has adhesive properties and thus can readily adhere to insulation layer 40 or to support layer 20. Alternatively, insulation layer 40 can be attached to support layer 20 or to insulation layer 40 by an adhesive 30.

The cover layer can contain various additives such as UV inhibitors, infrared stabilizing agents, antioxidant fillers and the like. An important aspect of the present invention is that through the use of such inhibitors, stabilizing agents, and antioxidants, etc., a laminate of the present invention can meet most strigent fire regulations throughout the United States including perhaps the most stringent, i.e. the Fire Regulations of Dade County, Fla. See "Roofing Materials & the Florida Building Code" the regulations therein, available via website www.floridaroof.com. The roofing laminates of the present invention can also readily be fabricated so that they comply with the "Florida Building Code" with regard to wind load requirements including hurricane resistance, see www.floridabuilding.org.

The cover layer can be made of various compositions that are impervious to water, flexible, etc., for example resins such as various epoxy resins, various alkyd resins, and various urethane resins; polymers such as various polyacrylates, various polymethacrylates, various urea urethanes, various polyurethanes, various latexes, various stucco; various plasters, various liquid rubbers, various synthetic rubbers, various EPDMs, and the like. Still other cover layers can contain various amounts of bio-ingredients, or compounds derived therefrom, such as corn, soy beans, as well as other agricultural items such as rice, cotton, sunflower seeds, and the like.

An essential component of the cover layer is the utilization of various compounds such as pigments, preferably of a light color, that reflect solar radiant light. Such pigments are generally metal oxides of aluminum, antimony, bismuth, boron, chrome, cobalt, gallium, indium, iron, lanthanum, lithium, magnesium, manganese, molybdenum, neodymium, nickel, niobium, silium, tin, vanadium, or zinc. Preferable metal oxides that may be employed according to the invention include $Cr_2O_3$, $Al_2O_3$, $V_2O_3$, $Ga_2O_3$, $Fe_2O_3$, $Mn_2O_3$, $Ti_2O_3$, $In_2O_3$, $TiBO_3$, $NiTiO_3$, $MgTiO_3$, $CoTiO_3$, $ZnTiO_3$, $FeTiO_3$, $MnTiO_3$, $CrBO_3$, $NiCrO_3$, $FeBO_3$, $FeMoO_3$, $FeSn(BO_3)_2$, $BiFeO_3$, $AlBO_3$, $Mg_3Al_2Si_{-3}O_{12}$, $NdAlO_3$, $LaAlO_3$, $MnSnO_3$, $LiNbO_3$, $LaCoO_3$, $MgSiO_3$, $ZnSiO_3$, or $Mn(Sb,Fe)O_3$. These and other pigments that can be utilized are set forth in U.S. Pat. No. 7,157,112 that is hereby fully incorporated by reference. An amount of such pigments and/or other compounds is utilized so that at least about 30%, desirably at least about 50%, and preferably at least about 60% and even at least about 70% of visible light incident upon the cover layer is reflected back into the atmosphere. Visible light is defined as light having a wavelength of from about 750 nanometers to about 380 nanometers. As a convenient compromise, a wavelength of about 555 nanometers is typically utilized. Determination of the amount of visible light reflected is determined in accordance with ASTM 897.

Infrared light generally ranges from about 750 nanometers up to about 2,500 nanometers. More desired ranges of reflected infrared radiation are from about 750 to about 2,500 nanometers, desirably from about 800 to about 2,450 nanometers, more desirably from about 900 to about 2,400 nanometers, preferably from about 1,000 to about 2,300 nanometers and more preferably from about 1,500 to about 2,000 nanometers. Ultraviolet light generally ranges from about 380 nanometers to about 10 nanometers.

An amount of various pigment or other compounds that reflect solar radiant light or energy, that is infrared, visible, and ultraviolet light, is utilized so that at least about 30%, desirably at least about 50%, preferably at least about 60%, and even at least about 70% of total solar radiation incident upon cover layer 60 is reflected, all determined in accordance with ASTM C 1549. Such solar radiant light reflective compounds include the pigments set forth hereinabove such as disclosed in U.S. Pat. No. 7,157,112, hereby fully incorporated by reference that include corundum-hematite crystal lattices, and also other reflective solar radiant pigments, and other compounds, etc. that are known to the art and to the literature. Suitable pigments of course are generally white or very light shades or pastel shades of colors such as blue, green, pink, and the like.

Figure 5:
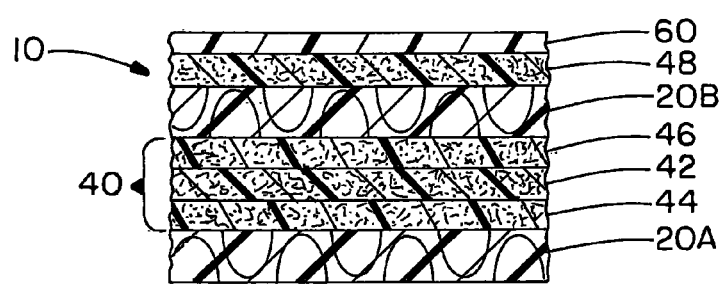
FIG. 5 is a cross-sectional view showing another embodiment of the present invention containing a plurality of insulation layers located or sandwiched between two support layers with a cover layer existing thereover.
Figure 4:
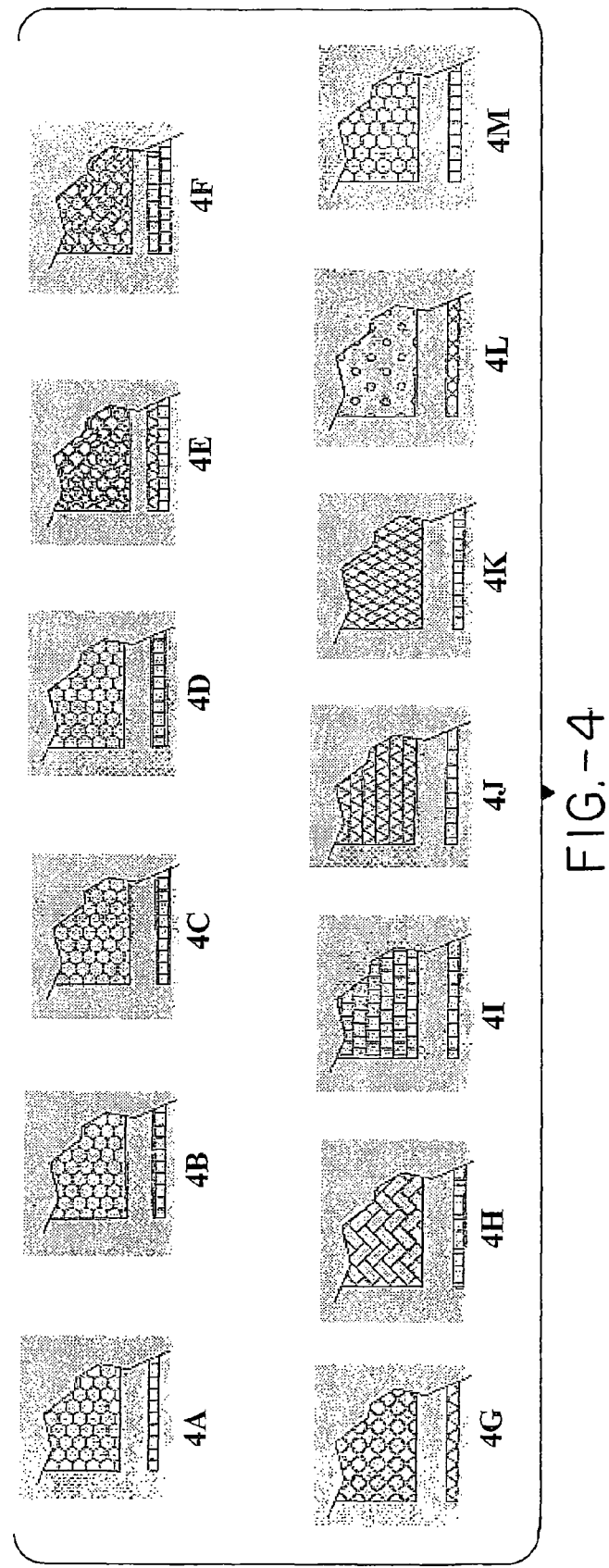
FIG. 4 sets forth a plurality of combined top and end views showing the configuration of the various cells of the support layer as well as a core thereof having a top layer and/or a bottom surface layer thereon wherein configuration A relates to a plain single core, configuration B relates to a core with a pre-top, configuration C relates to a core with a pre-top and bottom made from said material, configuration D relates to a core with a pre-top and bottom made from different materials, configuration E relates to multiple core layers, configuration F relates to multiple cores with solid center materials, configuration G relates to an offset closed core, configuration H relates to a herringbone core, configuration I relates to a brick core, configuration J relates to a pyramid core, configuration K relates to a diamond core, configuration L relates to egg crate closed core, and configuration M relates to a honeycomb core.

Another embodiment of the present invention is the existence of two or more support layers that contain an insulation layer therebetween such as shown in FIG. 5. The insulation layer can comprise one or more sub-layers of the various types of insulation layers or materials set forth above. That is, the individual insulation layers can be in the form of fibers or fabric layers, a layer of particles, a layer of pellets, a layer of foam, a layer of a gel, a layer of an earthen product, or any combination thereof. The specific embodiment of FIG. 5 contains support layers 20A and 20B that enclose or sandwich insulation layer 40 that contains a plurality of sub-layers therein. In this embodiment three sub-insulation layers exist with central layer 42 being any of the above-noted layers and desirably a layer containing various of the above-noted pellets, particles, or gels that can exist as a separate layer per se or be embedded or impregnated within a matrix such as a fiber layer or a foam layer. A preferred central layer 42 comprises aerogels embedded within a fabric, such as Spaceloft® made by Aspen of Northborough, Mass., that is a proprietary flexible nanoporous aerogel blanket insulation. Bottom insulation layer 44 can be any of the above-noted layers and top insulation layer, independently, can be the same or different of the above-noted layers. In other words, bottom insulation layer 44 and top insulation layer 46 can, independently, be a layer made from fibers, particles, pellets, foams, gels, earthen products, or combinations thereof. Another aspect of an embodiment containing two or more support layers as set forth in FIG. 5 is the utilization of an optional insulation layer 48 that is located on top of support layer 20B. Once again the make up or content of insulation layer 48 can be in the form of fibers or fabric layers, a layer of particles, a layer or pellets, a layer of foam, a layer of a gel, a layer of an earthen product, or any combination thereof. Located on top of the laminate of FIG. 5 is cover layer 60 that can be any of the compounds or materials set forth hereinabove and accordingly are incorporated by reference in lieu of repeating the same. Thus, the overall roofing laminate 10 can be in the form of many different layer combinations with respect to multiple support layers, multiple insulation layers and even multiple cover layers.

As noted above, the support layers such as 20A and 20B can be open cell or closed cell. The open and closed cells can be empty, partially full, or substantially filled with insulation materials such as the above-noted fibers, particles, pellets, gels, earthen products, or any combination thereof. Open cells are formed when the top or bottom surface layers 22 and 24 are discontinuous and closed cells are formed when the top and bottom surface layers are continuous.

The reference will be better understood by reference to the following examples which serve to illustrate, but not to limit the present invention.

A roofing laminate was made containing a cellular polypropylene support layer in the form of a 2 cm thick honeycomb with top and bottom surface layers of a polyester fabric physically attached to the honeycomb cell (R-value 2.2/in.). The insulation layer had a thickness of 1 cm made of polyester fabric impregnated with aerogel (R-value of 10.3/in.). The R-value would be 4.9/inch or 5.6 for a 1.2 inch thick system, assuming the adhesives have no appreciable effect on the R-value of the system. The honeycomb and the insulation were cut to the same dimensions of width and length, approximately (but not necessarily) a 4 foot by 10 foot panel. With a 2 inch offset to both the width and the length, the insulation layer was affixed to the honeycomb using an adhesive. Upon installation, the non-insulated face of each honeycomb was glued the roof substrate in a permanent manner. The panels are set with offset insulation arranged such that the honeycomb portions abut one another and the offset insulation from each panel overlapped the bare length of the corresponding side adjacent panel and insulation overlapped the bare width of the corresponding top or bottom adjacent panel. An adhesive was applied and affixed all the panels one to each other and formed a seamless, water tight surface. A coating layer of a styrene-butadiene copolymer was then applied to the panels to form an impervious solar radiation reflective cover layer.

While in accordance with the patent statutes, the best mode and preferred embodiment have been set forth, the scope of the invention is not limited thereto, but rather by the scope of the attached claims.

What is claimed is:

1. A roofing laminate, comprising:
   one or more non-foam, non-metal, plastic honeycomb support layers having a plurality of cells therein, wherein all cells are empty, wherein said one or more plastic support layers, independently, is made from a polyolefin, a polyamide, a polycarbonate, a polyester, a polyacrylate, a polymethacrylate, a non-foam polystyrene, a polyimide, a polyurethane, an EPDM, an ABS, a copolymer of any of the foregoing, a recycled thermoplastic, or any combination thereof; said support layer optionally having a top surface layer and optionally a bottom surface layer;
   one or more non-cementatious, foam insulation layers located on said support layer, said insulation layer having a thickness of from about 0.25 cm to about 25 cm and an R value of at least about 1.0 to about 40; and
   one or more radiant energy reflective, waterproof, pliable, flexible, top cover layers residing on said insulation layer, said cover layer having adhesive properties so that it readily and directly adheres to said insulation layer, said cover layer comprising radiant energy reflective compounds comprising metal oxides of antimony, bismuth, boron, chrome, cobalt, gallium, indium, lanthanum, lithium, magnesium, manganese, molybdenum, neodymium, nickel, niobium, cilium, tin, vanadium, zinc, or any combination thereof.

2. The roofing laminate of claim 1, wherein said one or more plastic support layers, independently, is derived from a polyolefin, a polyester, a polyurethane, an EPDM, an ABS, or copolymers of the foregoing, a recycled thermoplastic, or any combination thereof; and wherein said one or more foam insulation layers, further comprises natural fibers, cellulosic fibers, synthetic fibers; particles; pellets; aerogels; earthen products; or any combination thereof.

3. The roofing laminate of claim 2, wherein said support layer is impervious, and
wherein said foam insulation layer further comprises natural fibers, synthetic fibers, particles, aerogels, or any combination thereof.

4. The roofing laminate of claim 3, wherein crush-resistance of said support layer is at least about 1.75 kg per square centimeter, wherein the weight of said support layer is from about 0.5 to about 2.0 kg per square meter.

5. The roofing laminate of claim 3, wherein said cover layer is capable of reflecting at least 50% by weight of solar radiant light incident thereon having a wavelength of about $10^{-3}$ to about $10^{-8}$ meters.

6. The roofing laminate of claim 1, wherein said cover layer is capable of reflecting at least 30% of light incident thereon having an average wavelength of about 550 nanometers and is also capable of reflecting at least about 30% of solar radiant light incident thereon comprising infrared, visible, and ultraviolet light.

7. A process for forming a roofing laminate, comprising the steps of:
forming one or more non-foam, non-metal, plastic honeycomb support layers having a plurality of cells therein, wherein all cells are empty, wherein said one or more plastic support layers, independently, is made from a polyolefin, a polyamide, a polycarbonate, a polyester, a polyacrylate, a polymethacrylate, a non-foam polystyrene, a polyimide, a polyurethane, an EPDM, an ABS, a copolymer of any of the foregoing, a recycled thermoplastic, or any combination thereof; said support layer optionally have a top surface layer and optionally a bottom surface layer;
applying one or more non-cementatious, foam insulation layers to said plastic support layer and forming a support layer-insulation layer laminate, said insulation layer having a thickness of from about 0.25 cm to about 25 cm and an R value of at least about 1.0 to about 40; and
applying one or more radiant energy reflective, waterproof, pliable, flexible, top cover layers residing on said insulation layer, said cover layer having adhesive properties so that it readily and directly adheres to said support layer, said cover layer comprising radiant energy reflective compounds comprising metal oxides of antimony, bismuth, boron, chrome, cobalt, gallium, indium, lanthanum, lithium, magnesium, manganese, molybdenum, neodymium, nickel, niobium, cilium, tin, vanadium, zinc, or any combination thereof.

8. The process of claim 7, wherein said support layer has a crush-resistance value of from about 1.75 to about 3.5 kg per square centimeter and an overall thickness of from about 0.5 to about 10 cm.

9. The process of claim 8, wherein said one or more plastic support layers, independently, is derived from a polyolefin, a polyester, a polyurethane, an EPDM, an ABS, or copolymers of the foregoing, a recycled thermoplastic, or any combination thereof; and
wherein said one or more foam insulation layers, further comprises natural fibers, cellulosic fibers, synthetic fibers; particles; pellets; aerogels; earthen products; or any combination thereof.

10. The process of claim 9, wherein said cover layer is capable of reflecting at least 50% by weight of solar radiant light incident thereon having a wavelength of about $10^{-3}$ to about $10^{-8}$ meters.

11. The process of claim 7, wherein said support layer is impervious, wherein said support layer has a crush-resistance value of at least about 70,000 kg per square meter and a weight of from about 0.5 to about 2.0 kg per square meter; and
wherein said insulation layer has an R value of from about 2 to about 20.

12. The process of claim 7, wherein said support layer has a crush-resistance value of at least about 70,000 kg per square meter and a weight of less than about 2.0 kg per square meter; and
wherein said insulation layer has an R value of from about 2 to about 20;
wherein said one or more plastic support layers, independently, is derived from a polyolefin, a polyester, a polyurethane, an EPDM, an ABS, or copolymers of the foregoing, a recycled thermoplastic, or any combination thereof; and
wherein said one or more foam insulation layers, further comprises natural fibers, cellulosic fibers, synthetic fibers; particles; pellets; aerogels; earthen products; or any combination thereof.

* * * * *